United States Patent [19]

Kikinisi

[11] Patent Number: 5,671,120
[45] Date of Patent: Sep. 23, 1997

[54] PASSIVELY COOLED PC HEAT STACK HAVING A HEAT-CONDUCTIVE STRUCTURE BETWEEN A CPU ON A MOTHERBOARD AND A HEAT SINK

[75] Inventor: Dan Kikinisi, Saratoga, Calif.

[73] Assignee: Lextron Systems, Inc., Saratoga, Calif.

[21] Appl. No.: 600,022

[22] Filed: Feb. 7, 1996

[51] Int. Cl.$^6$ ............................ G06F 1/20; H05K 7/20
[52] U.S. Cl. ........................ 361/687; 361/699; 165/46
[58] Field of Search ............................ 257/712–714; 62/259.2; 165/46, 104.33, 80.3, 80.4; 364/708.1; 361/687, 704, 717–719, 683, 686, 699, 700, 703

[56] References Cited

U.S. PATENT DOCUMENTS

| | | | |
|---|---|---|---|
| 5,138,523 | 8/1992 | Benck et al. | 361/687 |
| 5,237,486 | 8/1993 | LaPointe et al. | 361/687 X |
| 5,313,362 | 5/1994 | Hatada et al. | 361/687 X |
| 5,316,491 | 5/1994 | Satou et al. | 439/159 |
| 5,331,506 | 7/1994 | Nakajima | 361/683 |
| 5,424,913 | 6/1995 | Swindler | 361/687 |

*Primary Examiner*—Michael W. Phillips
*Attorney, Agent, or Firm*—Donald R. Boys

[57] ABSTRACT

A computer structured with a motherboard has ICs mounted on one side of the motherboard and connections for ports and peripheral devices on the opposite side. The motherboard is mounted to a heat sink plate with heat-conductive structure compressed between the ICs mounted to the motherboard and the heat sink plate, so heat generated by the ICs is conducted into the heat sink plate. The heat sink plate forms one wall of an enclosure for the computer, and as an external wall, radiates heat from the ICs into the surroundings. A riser card with expansion slots is connected to the motherboard in a manner that expansion cards may be mounted to expansion ports either at the front or the rear of the enclosure. The enclosure is adapted to stand with the heat sink plate vertical to take advantage of convection as well as radiation cooling, and in some embodiments the outside surface of the heat sink plate is grooved or channeled to increase the area for radiation, and to aid convection flow.

17 Claims, 7 Drawing Sheets

PASSIVELY COOLED PC HEAT STACK HAVING A HEAT-CONDUCTIVE STRUCTURE BETWEEN A CPU ON A MOTHERBOARD AND A HEAT SINK

FIELD OF THE INVENTION

The present invention is in the area of computer architecture; that is, in the spatial and connective relationship of physical elements comprising the computer, and pertains in particular to apparatus and methods for cooling power-dissipating components.

BACKGROUND OF THE INVENTION

The present invention has particular application to that class of computer products known generally as personal computers (PCs), such as are typically used at a desk or other workstation, but may be extended to other kinds of computers as well.

The computing and mass storage components of PCs are typically provided in an enclosure, with connections for external peripherals. Typical peripherals include a keyboard, a pointer device, such as a mouse or trackball, and a display monitor, all of which are connected to the computing and storage components by cables through multi-pin connectors.

It is well known to those with skill in the computer arts that there has been a steady trend in development to provide faster and more powerful computers of all sorts, including PCs. As a consequence of higher speed and more power, power-using elements of PCs now dissipate more power as heat than ever before, and waste heat generated is dissipated within the enclosure. Heat, however, is not generated in a uniform manner within a PC enclosure. Typically, most heat is generated by integrated circuits operating at high frequency; CPU microprocessors and chip sets, for example.

In the case of ICs, which are traditionally mounted on printed circuit boards (PCBs), particularly state-of-the-art microprocessors used as CPUs, manufacturers have found it necessary in many cases to install small fans to impinge air directly on the IC package to avoid unacceptable temperature rise which may damage or destroy critical circuitry. Direct impingement of air on an IC may avoid unacceptable temperature rise, but the heat from the IC still causes a local temperature rise within the enclosure, unless measures are taken to prevent it, and local ambient temperature rise causes other components to run hotter. The usual way to handle ambient temperature rise in such an enclosure is to provide one or more circulation fans to pull cooler outside air into the enclosure while expelling heated air. Consequently, a single PC may have two or more mechanical fans for cooling purposes.

Unfortunately, mechanical fans are a main source of failure in PCs. It can be shown that the single biggest reason for PC equipment failure is malfunctioning fans. This might be expected to be true, since the ICs and circuitry in a computer have no moving parts, and are not subject to wear and mechanical deterioration, as are mechanical air movers such as fans. Moreover, although there are typically other mechanical devices mounted in a computer enclosure other than the fan or fans, such as hard disk and floppy disk drives, the drives are typically more carefully engineered products than are the fans. And even if a drive were to fail, the result does not put other components at risk, as does a fan failure.

What is needed is an arrangement of elements to form an operable computer, with capability to cool high-power ICs and the like, without use of mechanical fans or other active and mechanical cooling apparatus. Such a computer would be expected to operate quieter, to be more compact than current models, and to have enhanced reliability with no substantial cost penalty.

SUMMARY OF THE INVENTION

In a preferred embodiment a computer without mechanical cooling fans is provided, comprising a structural plate as one external member, the structural plate having a first side internal to the computer, and a second side facing to the outside of the computer; a motherboard having a CPU mounted on a first surface and connections for ports and peripheral devices on a second surface opposite the first surface, the motherboard substantially parallel to and spaced apart from the first side of the structural plate; a heat-conductive structure for transferring heat from the CPU to the structural plate, the heat-conductive structure positioned between the CPU and the first surface of the structural plate, and contacting both; a riser card engaged in an edge connector on the second surface of the motherboard, providing bus connections to at least one expansion port; and an enclosure enclosing the motherboard and the riser card and attached to the structural plate, with the structural plate forming one wall of the enclosure. Heat generated by the CPU is transferred to the structural plate through the heat-conductive structure, and is dissipated from the second side of the structural plate.

In some embodiments the second side of the structural plate is ribbed for enhancing surface area for radiating heat. Also in a preferred embodiment substantially all integrated circuit chips are mounted to the first surface of the motherboard facing the structural plate, and all connections to the motherboard are made from other than the first surface. In the preferred embodiment, too, the enclosure has a forward panel and a rear panel, with expansion ports in both, and the riser card has expansion edge connectors connected to the bus and positioned such that expansion cards engaged in the expansion edge connectors align with the expansion ports in the forward and rear panels.

Computers in various embodiments of the invention can be configured with a variety of hardware, software and peripherals, such as a hard disk drive and a floppy disk drive mounted within the enclosure and connected to the motherboard, and ports for keyboard, a pointer device, and a display monitor. A from door panel is provided for the computer with a door, the front door panel attached over the forward panel such that a space is created between the front door panel and the forward panel for connectors and ports in the forward panel, and the connectors and ports may be accessed by opening the door.

The architecture of the computer in most embodiments is such that the computer stands on a surface for operation with the first and second sides vertically oriented, which aids in radiation and convective cooling of the plate, to dissipate heat collected from the ICs on the computer's motherboard.

Heat-conductive material for compressing between the ICs on the motherboard and the structural plate can be any of several types known in the art, such as flexible sheet having heat-conductive material dispersed throughout, or one or more envelopes partially filled with a liquid with an evaporation temperature such that the operating temperature of the CPU causes the liquid to evaporate.

As a component for computers, a heat-sinked computer motherboard assembly is provided, comprising a structural plate having a first side and a second side; a motherboard having a CPU mounted on a first surface and connections for ports and peripheral devices on a second surface opposite the first surface, the motherboard substantially parallel to and spaced apart from the first side of the structural plate; and a heat-conductive structure for transferring heat from the CPU to the structural plate, the heat-conductive structure positioned between the CPU and the first surface of the structural plate, and contacting both. Heat generated by the CPU is transferred to the structural plate through the heat-conductive structure, and is dissipated from the second side of the structural plate. A method is provided for cooling integrated circuit components of a computer without using mechanical fans, comprising steps of (a) providing a motherboard with IC components requiring external cooling mounted on a first side of the motherboard, and connections to ports and peripheral devices mounted to other than the first side; (b) mounting the motherboard to a heat-sink plate with the IC components facing a first surface of the heat sink plate; and (c) interposing a heat-conductive structure between the IC components and the surface of the heat-sink plate and contacting both, such that heat generated by the IC components is transferred through the heat-conductive structure and into the heat-sink plate at the first surface, and is radiated from the heat sink plate at a second surface.

A computer according to embodiments of this invention, as summarized above and described in further detail below, need have no mechanical fan, and is therefore both a quieter and a more reliable machine. Fans, as stated above, are the foremost culprit in failure of computers, and when a fan fails, other and more expensive components are often damaged by overheating.

DESCRIPTION OF THE PREFERRED EMBODIMENTS

Figure 1:
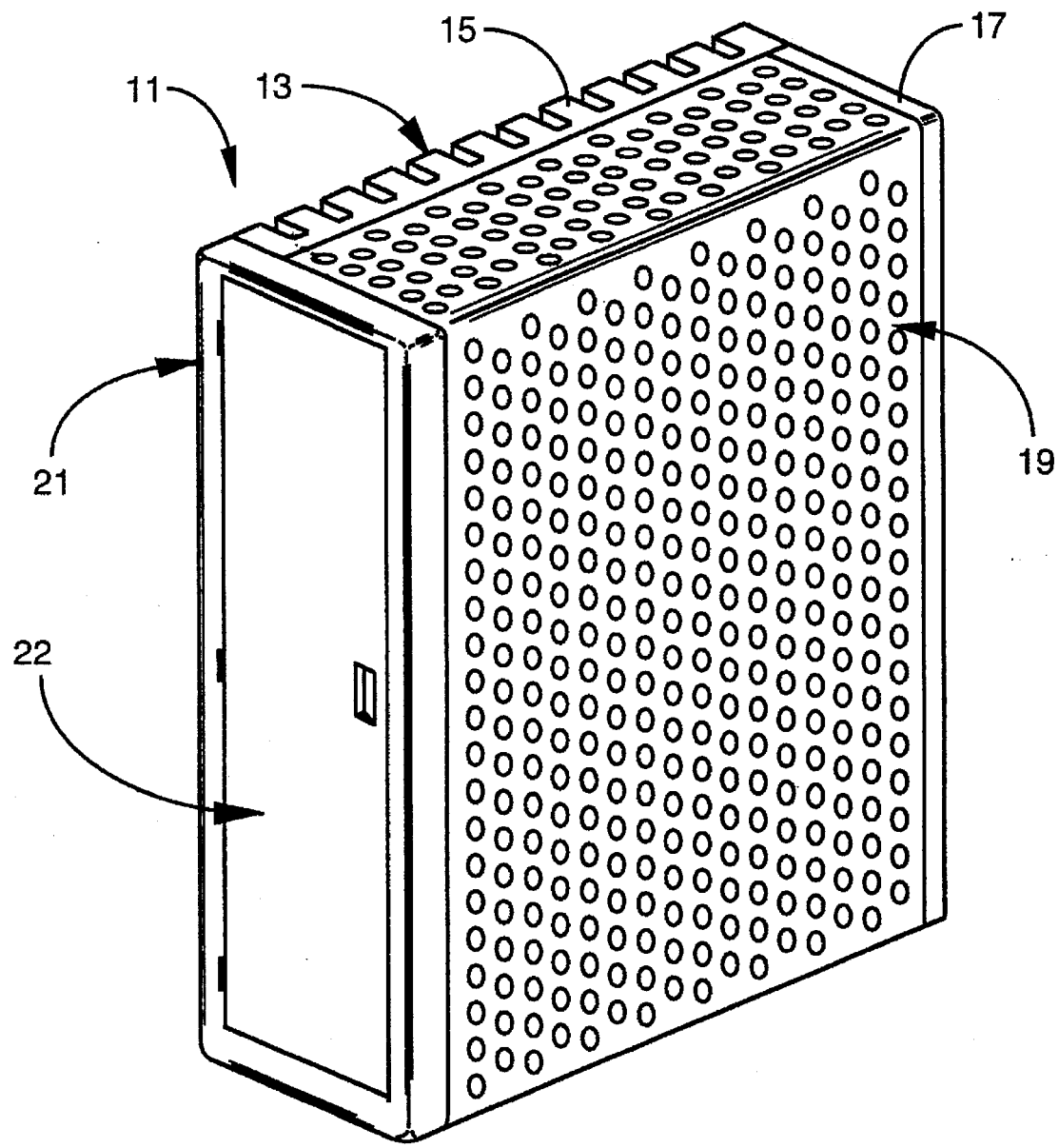
FIG. 1 is an isometric external view of a computer according to the present invention.

FIG. 1 is an isometric external view of a computer 11 according to an embodiment of the present invention, shown in operating position, having a heat-sink plate 13 with external ribs, such as rib 15, arranged vertically, providing increased surface area for radiation cooling and vertical channels for convection cooling.

Heat-sink plate 13 is a main structural support element for computer 11, and provides a cooling mechanism for heat-dissipating elements as well, as is further described below. A rear panel 17 and a forward panel not seen in FIG. 1 fasten to heat-sink plate 13. A three-sided, perforated outer cover 19 completes an enclosure for computer 11, and a front hinged door panel 21 provides front access to connectors from internal expansion cards and other ports, which, in the embodiment shown in FIG. 1, provide connection for a keyboard, a pointer device, and two serial ports, as well as other optional connections as described further below.

Outer cover 19 is perforated in the present embodiment in a pattern of small holes to allow air circulation from outside and through the enclosure. In other embodiments the outer cover may be constructed of a mesh or woven metal material, which is still air-permeable to allow for circulation.

In other embodiments also, a different set of connectors may extend to the front than those shown. Rear panel expansion slots are also provided, and a user is given considerable choice as to forward or rear panel connectivity.

Figure 2:
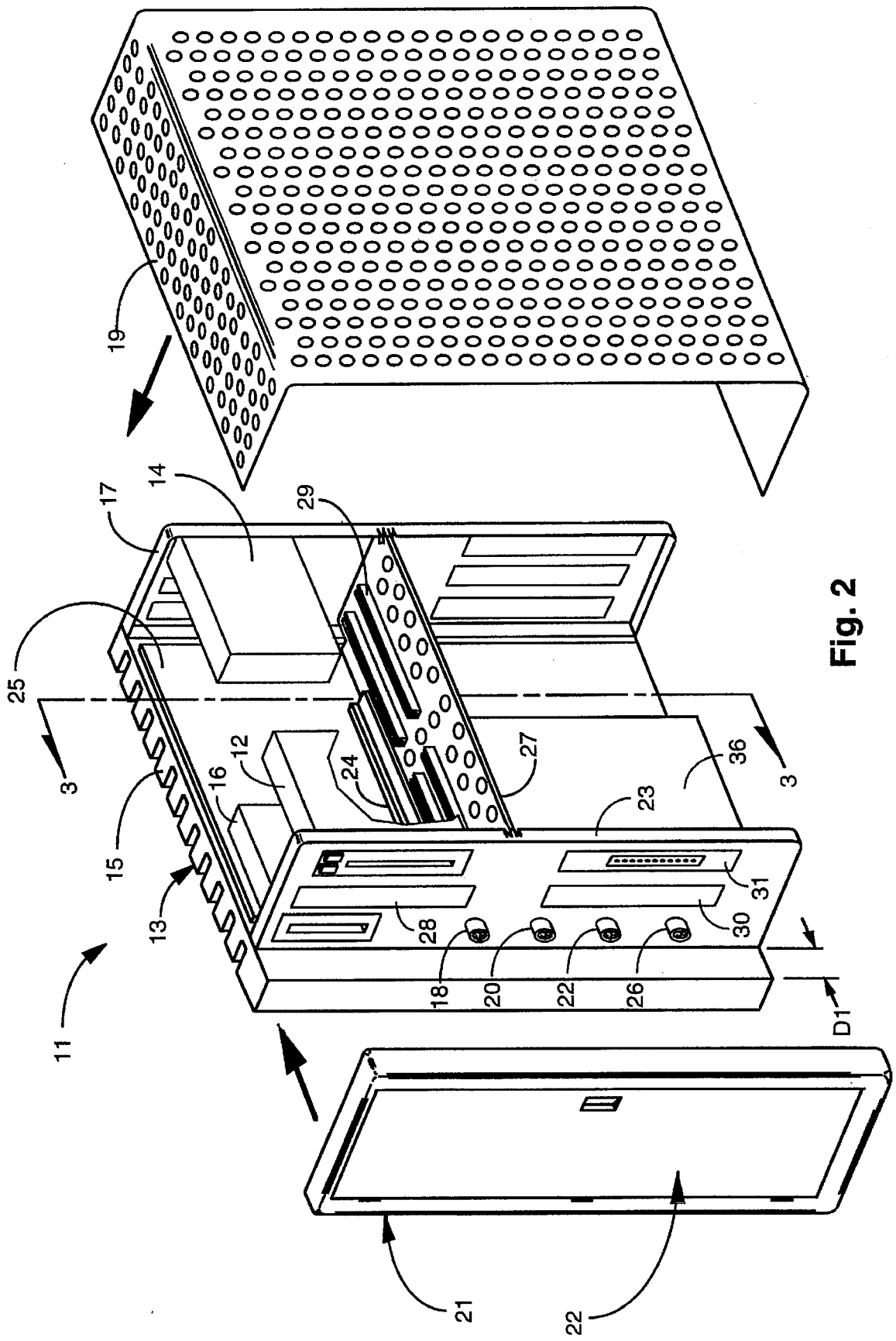
FIG. 2 is an isometric view of the computer of FIG. 1 with an outer cover removed to show relationships of internal components.

FIG. 2 is an isometric view of the computer of FIG. 1 with three-sided outer cover 19 and front hinged door panel 21 removed to show relationships of internal components. Some broken sections are utilized as well to further reveal the placement and mounting of internal components.

With outer cover 19 and front cover 21 removed, rear panel 17 and forward panel 23 are revealed as fastening to heat sink plate 13. In this embodiment snap-fasteners are used throughout for ease and economy of assembly, details of fastening are described more fully below. Rear panel 17 is about flush with the rear edge of heat sink plate 13, but forward panel 23 fastens a distance D1 from the front edge of heat sink plate 13. Distance D1, with front hinged door panel 21 in place, provides a space of about D1 depth behind door 22, between door 22 and forward panel 23. Connection for devices chosen to be front-connected and/or front accessed is provided in this space, as is described more fully below.

Heat-dissipating components of computer 11, such as a high-power CPU, memory chips, a cache, and bus controller chip set(s), are mounted to a motherboard 25, in a manner to be nearly flush with the motherboard. Motherboard 25 is in turn mounted with standoffs to heat-sink plate 13, with the heat-producing components on one side toward the heat sink plate. Mounting of the motherboard to the heat sink plate in a manner to cool the heat-producing components without a need for mechanical fans is described more fully below, with reference to FIG. 3.

Referring still to FIG. 2, wherein the orientation of computer 11 in the figure is the operating orientation to assure maximum cooling, motherboard 25 has at least one edge connector 24 for a riser card 27, positioned such that riser card 27 is substantially maintained in a horizontal plane, and extends between rear panel 17 and forward panel 23. In one embodiment stamped grooves are provided in the forward and rear panels to provide additional support for the riser card.

Riser card 27 has expansion slots, such as expansion edge connector 29, on both sides, so some expansion slots face upward and others downward in the orientation of FIG. 2. In the present embodiment, there are 8 expansion slots, three forward and 5 to the rear. Some space is dedicated in the present embodiment to a floppy disk drive and to a hard disk drive. In other embodiments there may be more or fewer expansion slots, depending on optional configuration.

Riser card 27, as seen in FIG. 2, is perforated liberally so as to not impede convected air flow through the internal volume of computer 11, and expansion slots are positioned, as is well-known in the art, so connectors on expansion cards, such as expansion card 36, will align with expansion ports, such as expansion port 31. Unused expansion ports are fitted with metal or plastic covers, as is well known in the art.

In the present embodiment, framing is provided assembled to forward panel 23 for a floppy disk drive 12 and to rear panel 17 for a hard disk drive 14. These drives are connected to the motherboard to such as an integrated Drive Electronics (IDE) controller in a manner familiar to those with skill in the art. These connections are not shown in FIG. 2 to avoid confusion.

In the space behind forward panel 23 adjacent to motherboard 25, framing is provided for a Personal Computer Memory Card International Architecture (PCMCIA) docking bay 16 with connection to the motherboard by conventional hardware not shown. A keyboard connector 18, a pointer port 20, and two serial ports 22 and 26 are also provided with conventional connection to the motherboard. These ports are all arranged through forward panel 23 to be near the motherboard, so connection to the motherboard is facilitated.

With the space used by the disk drives, the PCMCIA slot, and other ports, there is still space for 8 expansion slots, three forward (28, 30, and 31), and 5 to the rear. In this arrangement connectors from at least three expansion cards can be faced to the front, providing easy connectability and access. A sound card may be mounted in a forward expansion slot, for example, so speakers may be front connected.

Figure 3A:
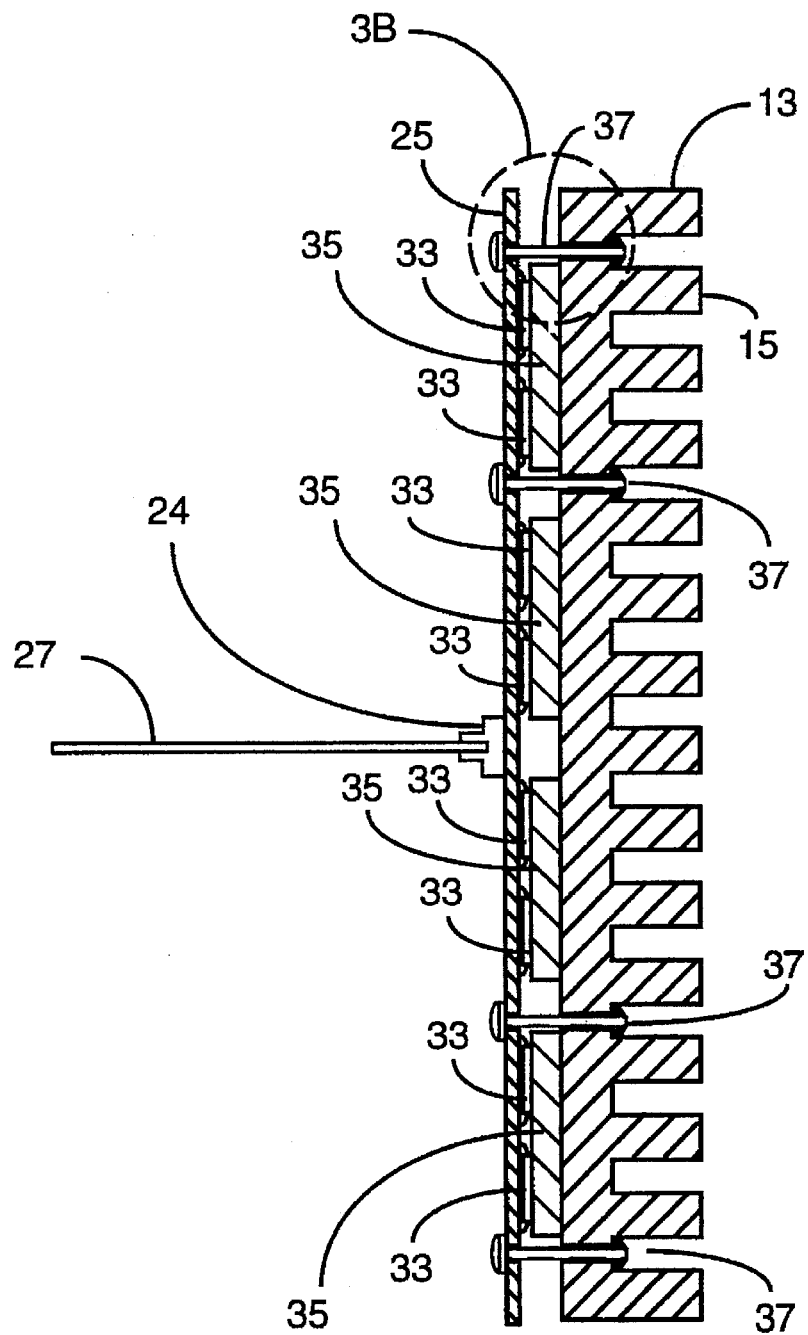
FIG. 3A is a cross section through a portion of computer 11, taken along section line 3—3 in FIG. 2.

FIG. 3A is a partial cross-section of motherboard 25 and heat sink plate 13 along section line 3—3 of FIG. 2. Devices on the motherboard, such as a cache, CPU, chip set, and the like, represented by element numbers 33, are all mounted to one side of motherboard 25 in a low-profile manner, and this mounting side is faced toward heat sink plate 13 in assembly. Mounting pads for surface-mount devices are provided for all the IC components on this one side of motherboard 25, and conductive traces to connectors, such as edge connector 24 for riser card 27 and for such as an IDE connector and the like, are provided on the opposite side of the motherboard from the IC mountings. Connectivity from one side of the motherboard to the other is provided by such as plated through-holes, as is known in the art, and it will be apparent to those with skill in the art that there many optional ways in the art whereby chip components may be mounted on one side and connectivity for such as expansion cards, ports, and disk drives may be provided on the opposite side.

Heat-conductive, flexible structures 35 are positioned between each of the heat-producing chips on the motherboard and the heat sink, and the motherboard is mounted by fasteners 37 in a manner such that the heat-producing devices on the motherboard are urged intimately against structures 35, which are at the same time urged intimately against heat sink 13, providing a low-impedance heat-conductive path from the heat-producing devices into the heat sink, which has a substantial thermal mass.

There are several commercially available heat-conductive and flexible structures 35. One alternative is Chomerics™ aluminum oxide-filled rubber. Another is flexible bags partially filled with a fluid having a low phase-transformation temperature, which conduct heat across the width of the bag in the manner of a heat pipe, by evaporation and condensation.

In some embodiments of the invention not all chips are mounted on the one side of the motherboard toward the heat-sink plate, but only those chips, such as a high-power CPU that require cooling to avoid excessive temperature rise that would damage either the physical structure or the functionality of the chip. Some devices that do not require extra cooling could be mounted on the side of the motherboard away from the heat sink.

Figure 3B:
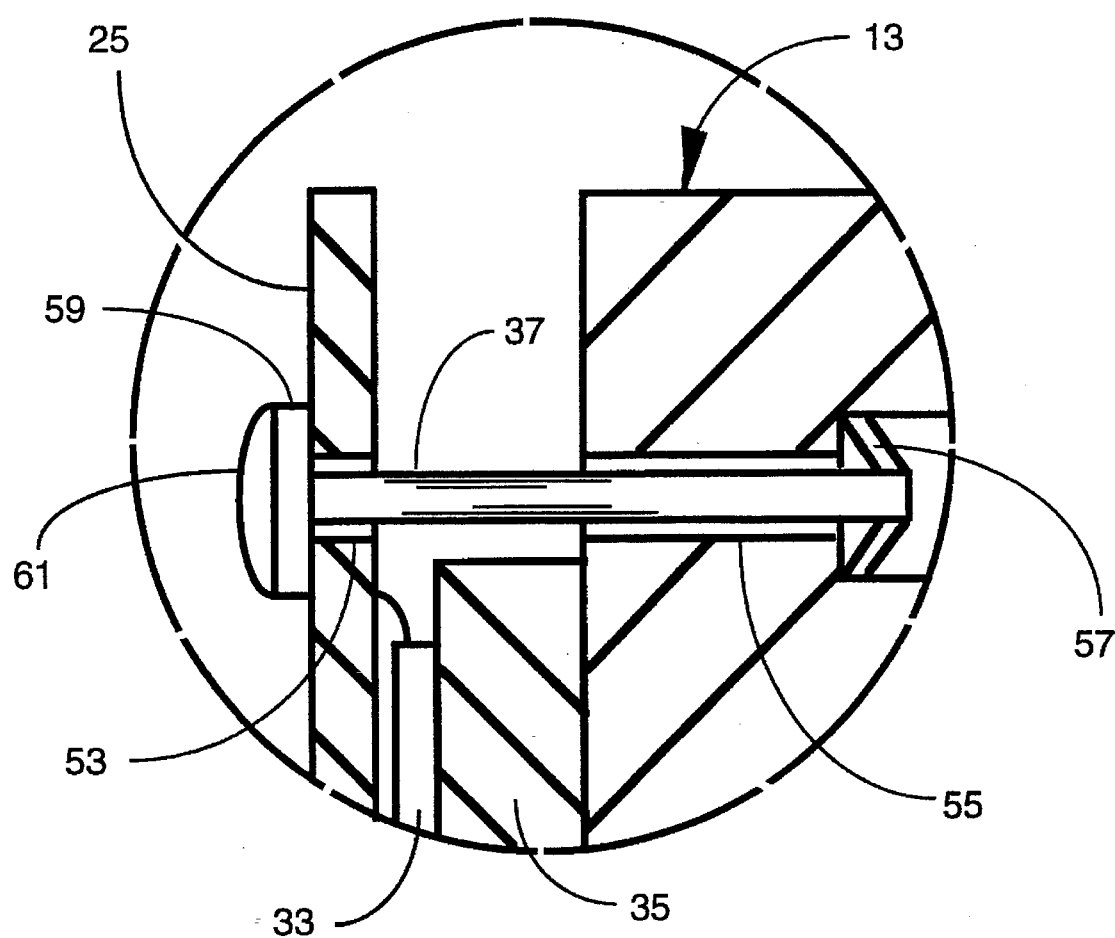
FIG. 3B is an enlargement of a portion of FIG. 3A shown in dotted circle 3B, further illustrating fastening of a motherboard to a heat sink plate.

FIG. 3B is an enlargement of the portion of FIG. 3A in dotted circle 3B, showing further detail of fastening of motherboard 25 to heat sink plate 13. Holes 53 are provided in motherboard 25 in a pattern to assure secure fastening of the motherboard to the heat sink plate while assuring that all chips 33 are urged intimately against heat-conducting flexible structures 35, and that structures 35 are urges against the heat sink plate. Holes 55 are provided in heat sink plate 13 in a pattern to match the pattern of holes in motherboard 25, and also to pass through heat-sink plate 13 into grooves formed between ribs 15. Fastener 37 in this embodiment has flexible extensions 57 on one end and an elastic washer 59 under a head 61, such that the fastener may pass through holes 53 and 55 with extensions 57 flexing, and, with depression of washers 59, extensions 57 pass through hole 55 and expand, securely fastening the mother board in position. The length of fasteners 37 is such that the desired compression of structures 35 is accomplished.

Figure 4A:
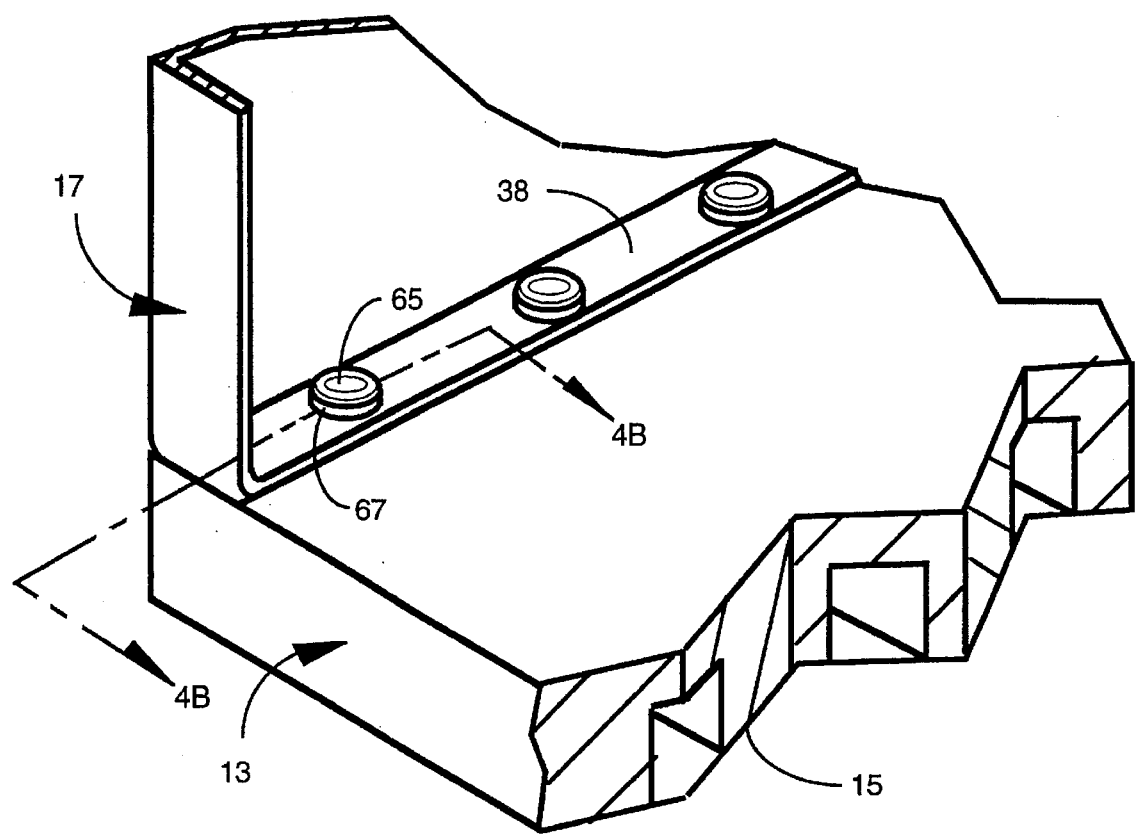
FIG. 4A is an isometric view of a portion of computer 11, showing how a rear panel fastens to a structural and functional plate.
Figure 4B:
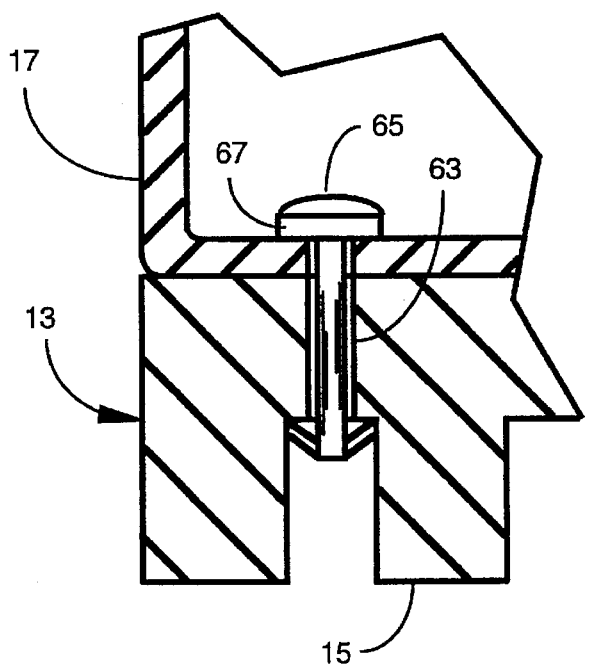
FIG. 4B is a partial cross-section taken along section line 4B—4B of FIG. 4A, further illustrating fastening of the rear panel to the plate.

FIG. 4A is an isometric view of a portion of rear panel 17, heat-sink plate 13, partially in cross-section, showing how panel 17 mounts to heat-sink plate 13 in the present embodiment. Panel 17 has a rear flange 38 having holes through which fasteners 65 pass into matching holes in heat-sink plate 13. FIG. 4B is a cross section along section line 4B—4B of FIG. 4A, showing that holes 63 open into grooves between ribs 15 of the heat-sink plate. Fasteners 65 are similar to fasteners 37 above for holding motherboard 25, but of a different length. Fasteners 65 engage by depression of elastic washers 67. Provision of several fasteners along flange 38 assures secure fastening of the rear panel to the heat-sink plate.

Forward panel 23 (FIG. 2) is flanged in the same manner as described for rear panel 17, and is fastened to heat sink plate 13 in the same manner as described immediately above for rear panel 17.

Figure 5A:
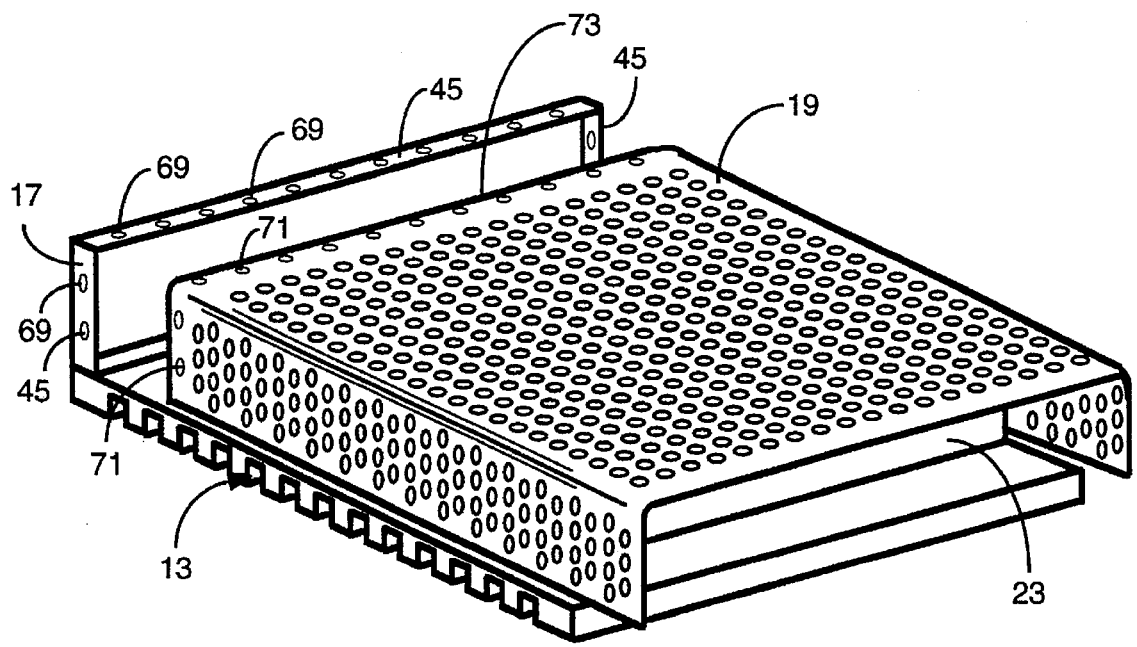
FIG. 5A is an isometric view of a computer according to the present invention showing assembly of the outer cover.

FIG. 5A is an isometric view of a rear panel 17 assembled to a heat-sink plate 13 with an outer cover 19 in position to be assembled, showing how outer cover 19 assembles to the rear panel. At this point in assembly several other assembly steps will have already been accomplished. The motherboard is mounted, both the rear and forward panels are mounted, the riser card and any expansion cards are in place, and ports and drives are assembled and connected. In short, all internal assembly is completed, so an operable computer is provided lacking only the outer cover and front hinged door panel.

Panel 17 has flanges 45 on each side and the edge away from plate 13. In the manufacture of rear panel 17 small areas are upset by a punch, providing gripping depressions 69 for holding cover 19 in place when assembled. Depressions 71 are stamped in cover 19 at appropriate positions such that gripping depressions 69 engage depressions 71 when cover 19 is urged into panel 17 with front edge 73 under flange 45 on all three sides.

Figure 5B:
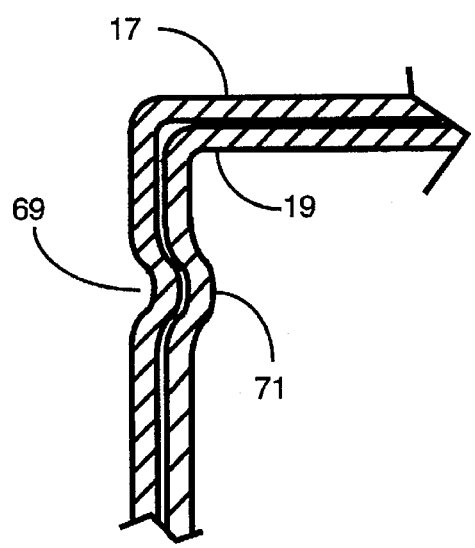
FIG. 5B is a section view through a portion of FIG. 5A showing how the outer cover and the rear panel are engaged in assembly in one embodiment.

FIG. 5B is a cross-section through one gripping depression 69 in a flange 45 of panel 17 and one depression 71 in cover 19, with cover 19 assembled, showing how the depressions cooperate to hold cover 19 in place once assembled.

In one embodiment the sides of cover 19 are of a height to just meet with heat sink plate 13 in assembly. In alternative embodiments a formed skirt overlaps a portion of heat sink plate 13 after assembly. It will be apparent to those with skill in the art that there are many alternatives to grips and registers which may be devised to fit and hold cover 19 under flanges of panel 17. Conventional fasteners of many sorts may be used. The snap-together techniques described, however are preferable for ease of assembly at a low cost.

Figure 6:
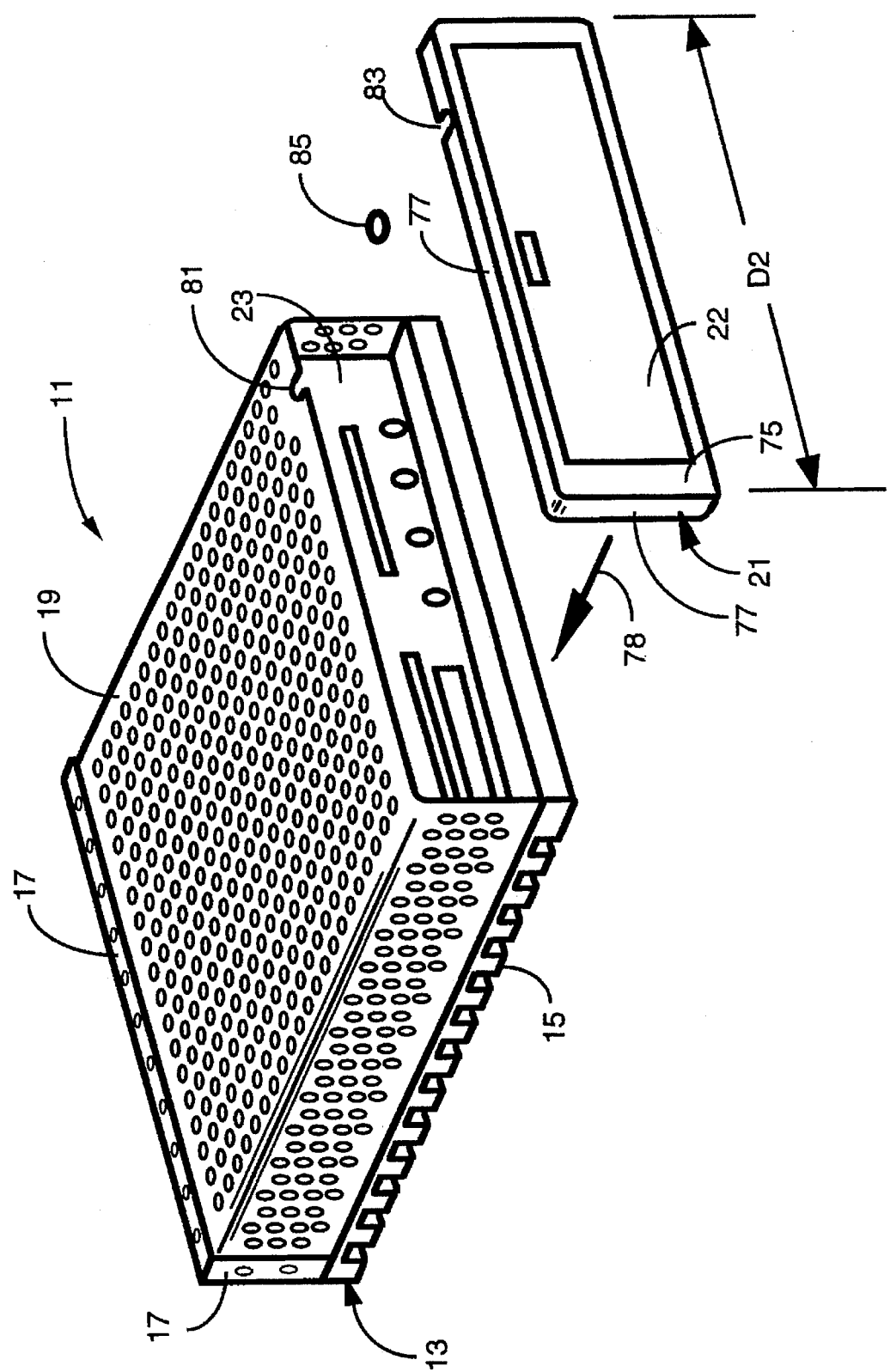
FIG. 6 is an isometric view of a computer in an embodiment of the invention, illustrating how the front hinged door panel is assembled to the computer structure.

FIG. 6 is an isometric view showing cover 19 engaged in rear panel 17 which is fastened to heat sink plate 13. Cover 19 rests over, but in this embodiment does not fasten to forward panel 23. Front hinged door panel 21 in this embodiment is made of injected molded plastic to have a front face 75 with door 22, and side flanges 77 on all four sides.

Dimension D2 of front hinged door panel 21 is substantially the same as the dimension across computer 11 including outer cover 19 and heat sink plate 13, also shown as dimension D2 in FIG. 6. Front hinged door panel 21 is assembled to the heat sink plate and outer cover in the direction of arrow 78 with all four flanges 75 of door panel 21 to the outside. Door panel 21 has molded extensions on the inside of flanges 75 on all four sides which engage depressions 79 in heat sink plate 13 and cover 19 for that purpose, so door panel 21 snaps into place and is retained. This engagement is much the same as shown in FIG. 5B for the outer cover and rear panel. In some cases one or more conventional screw fasteners may be added to comply with assembly regulations in force in particular jurisdictions.

An opening 81 is provided in outer cover 19 and a matching opening 83 is provided in a flange of front door panel 21 such that when the panel is assembled, an opening is left for cable entry and egress with door 22 closed. A grommet 85 placed in one or the other of the openings at the time of assembly provides for a smooth edge at this opening when assembly is complete. In some embodiments this entry/egress opening is provided as a slot opening to one edge of front face 75 toward door 22, so, with door 22 open, one may slide cables into the slot and secure them there.

It will be apparent to those with skill in sheet metal and assembly arts that there are many alternative assembly schemes that might be used to accomplish the assembly described herein, in a manner quick, easy, and inexpensive, and also to allow for quick and easy access to such as expansion slots for addition of expansion cards and the like.

Power to computer 11 is provided by an external conversion power supply with cable connections and one or more ports in rear panel 17 for adequate power at specific voltages required, such as 3.3 VDC for electronics and 12 VDC for mass storage drives. Connection is made at the rear panel for a display monitor, but this connection may be at the front as well.

In some embodiments front hinged door panel 21 has LEDs mounted and connected for indicating HDD drive state, power on, and the like. In these embodiments connection is made before front door panel 21 is added. Such variations are well-known in the art and within the ability of those with skill in the art.

It will be apparent to those with skill in the art that there are many alternatives and alterations that might be made in the embodiments described herein without departing from the spirit and scope of the invention. For example, there are many different architectures for such computers, using different CPUs and different arrangements of bus structures and the like. Connectivity to peripheral devices may be managed in many different ways known in the art as well. In one embodiment for example, such a computer could use a Universal Serial Bus (USB) for external connectivity, as is being developed by an industry group at the time of this application.

There are no limitations in the architecture disclosed herein to impede hardware or software as used in other computers known in the art, and no such differences are intended. The scope of the present invention is limited only by the claims which follow:

What is claimed is:

1. A computer without mechanical cooling fans, comprising:

a structural plate as one external member, the structural plate having a first side internal to the computer, and a second side facing to the outside of the computer;

a motherboard with a bus and having a CPU mounted on a first surface and connections for ports and peripheral devices on a second surface opposite the first surface, the motherboard substantially parallel to and spaced apart from the first side of the structural plate;

a heat-conductive structure for transferring heat from the CPU to the structural plate, the heat-conductive structure positioned between the CPU and the first surface of the structural plate, and contacting both;

a riser card engaged in an edge connector on the second surface of the motherboard, providing bus connections to at least one expansion port; and an enclosure enclosing the motherboard and the riser card and attached to the structural plate, with the structural plate forming one wall of the enclosure;

wherein heat generated by the CPU is transferred to the structural plate through the heat-conductive structure, and is dissipated from the second side of the structural plate.

2. A computer as in claim 1 wherein the second side of the structural plate is ribbed for enhancing surface area for radiating heat.

3. A computer as in claim 1 wherein, in addition to the CPU, substantially all integrated circuit chips are mounted to the first surface of the motherboard facing the structural plate, and all connections to the motherboard are made from other than the first surface.

4. A computer as in claim 1 wherein the enclosure has a forward panel and a rear panel, with expansion ports in both panels and the riser card has expansion edge connectors connected to the bus and positioned such that expansion cards engaged in the expansion edge connectors align with the expansion ports in the forward and rear panels.

5. A computer as in claim 4 additionally comprising a hard disk drive and a floppy disk drive mounted within the enclosure and connected to the motherboard, and ports for keyboard, a pointer device, and a display monitor.

6. A computer as in claim 1 additionally comprising a front door panel having a door, the front door panel attached over the forward panel such that a space is created between the front door panel and the forward panel for connectors and ports in the forward panel, and the connectors and ports may be accessed by opening the door.

7. A computer as in claim 1 adapted for operating in an orientation wherein the structural plate has the first and second sides vertically oriented.

8. A computer as in claim 1 wherein the heat-conductive structure comprises flexible polymer material having heat-conductive material dispersed throughout.

9. A computer as in claim 1 wherein the heat-conductive structure comprises at least one pliant envelope partially filled with a liquid with an evaporation temperature such that the operating temperature of the CPU causes the liquid to evaporate.

10. A heat-sinked computer motherboard assembly, comprising:
- a structural plate having a first side and a second side; a motherboard having a CPU mounted on a first surface and connections for ports and peripheral devices on a second surface opposite the first surface, the motherboard substantially parallel to and spaced apart from the first side of the structural plate; and
- a heat-conductive structure for transferring heat from the CPU to the structural plate, the heat-conductive structure positioned between the CPU and the first surface of the structural plate, and contacting both;
- wherein heat generated by the CPU is transferred to the structural plate through the heat-conductive structure, and is dissipated from the second side of the structural plate.

11. A heat-sinked computer motherboard assembly as in claim 10 wherein the second side of the structural plate is ribbed for enhancing surface area for radiating heat.

12. A heat-sinked computer motherboard assembly as in claim 10 wherein, in addition to the CPU, substantially all integrated circuit chips are mounted to the first surface of the motherboard facing the structural plate, and all connections to the motherboard are made from other than the first surface.

13. A heat-sinked computer motherboard assembly as in claim 10 wherein the heat-conductive structure comprises a flexible sheet having heat-conductive material dispersed throughout.

14. A heat-sinked computer motherboard assembly as in claim 10 wherein the heat-conductive structure comprises at least one pliant envelope partially filled with a liquid with an evaporation temperature such that the operating temperature of the CPU causes the liquid to evaporate.

15. A method for cooling integrated circuit components of a computer without using mechanical fans, comprising steps of:
- (a) providing a motherboard with IC components requiring external cooling mounted on a first side of the motherboard, and connections to ports and peripheral devices mounted to other than the first side;
- (b) mounting the motherboard to a heat sink plate with the IC components facing a first surface of the heat sink plate; and
- (c) interposing a heat-conductive structure between the IC components and the surface of the heat sink plate and contacting both, such that heat generated by the IC components is transferred through the heat-conductive structure and into the heat sink plate at the first surface, and is radiated from the heat sink plate at a second surface.

16. The method of claim 15 wherein the heat-conductive structure comprises a flexible sheet having heat-conductive material dispersed throughout.

17. The method of claim 15 wherein the heat-conductive structure comprises at least one pliant envelope partially filled with a liquid with an evaporation temperature such that the operating temperature of the CPU causes the liquid to evaporate.

\* \* \* \* \*